US007500060B1

(12) United States Patent
Anderson et al.

(10) Patent No.: US 7,500,060 B1
(45) Date of Patent: Mar. 3, 2009

(54) HARDWARE STACK STRUCTURE USING PROGRAMMABLE LOGIC

(75) Inventors: James B. Anderson, Santa Cruz, CA (US); Sean W. Kao, Pasadena, CA (US); Arifur Rahman, San Jose, CA (US)

(73) Assignee: XILINX, Inc., San Jose, CA (US)

( * ) Notice: Subject to any disclaimer, the term of this patent is extended or adjusted under 35 U.S.C. 154(b) by 0 days.

(21) Appl. No.: 11/724,808

(22) Filed: Mar. 16, 2007

(51) Int. Cl.
*G06F 12/00* (2006.01)
(52) U.S. Cl. .......................... 711/132; 711/203; 711/6; 711/170
(58) Field of Classification Search .................. 326/41, 326/38–40; 711/132, 203, 170
See application file for complete search history.

(56) References Cited

U.S. PATENT DOCUMENTS

| 5,930,359 | A | * | 7/1999 | Kempke et al. ............. 713/160 |
| 6,282,631 | B1 | * | 8/2001 | Arbel ........................... 712/35 |
| 6,759,869 | B1 | * | 7/2004 | Young et al. .................. 326/41 |
| 6,848,044 | B2 | | 1/2005 | Eisen et al. |
| 6,948,034 | B2 | * | 9/2005 | Aoki ........................... 711/132 |

OTHER PUBLICATIONS

Nakamura, K. et al., "Real-Time Multimedia Data Processing Using VLIW Hardware Stack Processor", Proceedings of Joint Workshop, Apr. 1-3, 1997, pp. 296-301, available from IEEE, 3 Park Avenue, 17th Floor, New York, NY 10016-5997.
Bailey, Chris, "A Proposed Mechanism for Super-pipelined Instruction-Issue for ILP Stack Machines", Dept. Computer Science, University of York, UK, Sep. 2004, pp. 121-129, available from IEEE, 3 Park Avenue, 17th Floor, New York, NY 10016-5997.

* cited by examiner

*Primary Examiner*—Vibol Tan
(74) *Attorney, Agent, or Firm*—Pablo Meles; Justin Liu

(57) ABSTRACT

A hardware stack (HSTACK) structure using programmable logic can include a look-up table (LUT) random access memory (RAM) circuit and circuitry within the LUT RAM circuit for propagating data upwards and downwards. The hardware structure can be arbitrarily assembled into a larger structure by adding stacks to a top portion, a bottom portion, or a portion between the top portion and the bottom portion. The hardware stack structure can further include a virtual stack (VSTACK) structure coupled to the HSTACK structure within a field programmable gate array (FPGA) fabric. The VSTACK can be arranged in the form of an appended peripheral memory and cache control for virtual extension to an HSTACK address space. The hardware stack structure can further include an auxiliary reset circuit.

19 Claims, 7 Drawing Sheets

HARDWARE STACK STRUCTURE USING PROGRAMMABLE LOGIC

FIELD OF THE INVENTION

This invention relates generally to hardware stack structures, and more particularly to a method and system for configuring a hardware stack structure and a virtual stack structure using programmable logic.

BACKGROUND OF THE INVENTION

As chip capacity continues to increase significantly, the use of field programmable gate arrays (FPGAs) is quickly replacing the use of application specific integrated circuits (ASICs). An ASIC is a specialized integrated circuit that is designed for a particular application and can be implemented as a specialized processor-based system. FPGA is a programmable logic device (PLD) that has an extremely high density of electronic gates as compared to an ASIC. This high gate density allows a highly flexible implementation of processor-based systems and has contributed immensely to the popularity of FPGA devices. Notably, FPGAs can be designed using a variety of architectures that can include hard and soft processor elements, user configurable input/output blocks (IOBs), and programmable logic blocks having configurable interconnects and switching capability.

The advancement of computer chip technology has also resulted in the development of embedded processors and controllers and even embedded networks having multiple linked devices. An embedded processor or controller can be a microprocessor or microcontroller circuitry that has been integrated into an electronic device as opposed to being built as a standalone module or "plugin card." Advancement of FPGA technology has led to the development of FPGA-based system-on-chip (SoC) and network-on-chip (NoC) including FPGA-based embedded processor SoCs. A SoC is a fully functional product having its electronic circuitry contained on a single chip. While a microprocessor chip requires ancillary hardware electronic components to process instructions, SoC would include all required ancillary electronics. As platform architectural forms, SoC and NoC are nominally understood to include at least one processor-element. An obvious conceptual extension is instancing of multiple processor elements coupled to each other via a bus (SoC) or network (NoC). A simple example is a cellular telephone SoC that includes a microprocessor, encoder, decoder, digital signal processor (DSP), RAM and ROM, (i.e., two processing elements). In this context, processing elements are not restricted to microprocessor, but may include RISC, DSP, Micro-Controller, and cyclostatic processing engines or other processing elements. Furthermore, processing elements in this context should also be understood to include something more than just a mere look-up table (LUT).

In order for device manufacturers to develop FPGA-based SoCs or FPGA-based embedded processor SoCs, such device manufacturers acquire intellectual property rights for system components and/or related technologies that are utilized to create the FPGA-based SoCs. These system components and/or technologies are called cores or Intellectual Property (IP) cores. An electronic file containing system component information can typically be used to represent the core. A device manufacturer will generally acquire several cores that are integrated to fabricate the SoC. More generically, the IP cores can form one or more of the processing modules in an FPGA-based SoCs. The processing modules can either be hardware or software based.

Platform/Embedded-System design by definition involves system-level integration of processors with Intellectual Property (IP) Core components. Specific classes of processors that might be employed in such systems include RISCs, DSPs, CISCs, and micro-Controllers. Platform architectural paradigms that might be employed include System-on-Chip (SoC), Network-on-Chip (NoC), and Multi-Processor Systems-on-Chip (MP SoC). The IP Cores that might be employed in such systems are typically of a specialized nature, and take advantage of available hardware-level concurrency so as to achieve highest performance.

Hardware stacks constitute a basic and ubiquitous element often used in FPGA-based designs. Further, they can be advantageously employed in connection with FPGA-based SoCs or FPGA-based embedded processor SoCs. Hardware stacks may be employed in connection with state management in multi-threaded Super-Scalar and Very Long Instruction Word (VLIW)-style processor architectures. Processing threads thus derived may be generated within context of multi-tasking or quasi-concurrent data-flow block processing. The most common implementation is a pointer-based stack. That is, all stack elements are stored in memory, either on-chip or off-chip, with a stack pointer pointing to the top of the stack, the first element to be popped. Each stack element has a data component and a pointer, pointing to the memory address of the next stack element. This linked list implementation is efficient in terms of using only memory and being relatively energy-efficient.

Other implementations of a hardware stack use shift registers as a stack. Since every element must be shifted for every push or pop operation, this implementation engenders relatively high power consumption. Some implementations of a stack use a shift register for the first N elements where N is small and a pointer-based stack in memory is used for the backend storage of the stack. One implementation of a pointer-based stack discussed in U.S. Pat. No. 6,848,044 to Eisen et al. allows for recovering pointers to stack elements by comparing pointer addresses until the desired stack element is found. This is useful in instruction flushes.

Stack-based processors employ a stack where the last two elements placed on the stack, (i.e., stack 'TOP'), are mapped to a special purpose register set as inputs to an arithmetic logic unit (ALU). In this configuration it is useful for at least the first two elements to be placed in their own registers and not as part of a larger memory. In this case a shift-register style stack is used for at least the first two elements. Notwithstanding the existing stack architectures known, hardware stacks are not generally known in the context of FPGAs.

SUMMARY OF THE INVENTION

Embodiments herein involve the application hardware stacks and virtual stack structures using FPGA or programmable logic.

In a first aspect of the present invention, a hardware stack (HSTACK) structure using programmable logic can include a look-up table (LUT) random access memory (RAM) circuit and circuitry within the LUT RAM circuit for propagating data upwards and downwards. In some embodiments the hardware structure may be arbitrarily assembled into a larger structure by adding stacks to a top portion, a bottom portion, or a portion between the top portion and the bottom portion. In some embodiments the hardware stack structure may further include a virtual stack (VSTACK) structure coupled to the HSTACK structure within a field programmable gate array (FPGA) fabric. The VSTACK may be arranged in the form of an appended peripheral memory and cache control for virtual extension to an HSTACK address space. The hardware stack structure may further include an auxiliary reset circuit. The hardware stack structure may further include an optional HSTACK broadside READ function or a HSTACK broadside READ/WRITE function. The hardware stack structure may further include an HSTACK state management circuit or a domino style pre-charge circuit.

In accordance with a second aspect of the present invention, a hardware stack (HSTACK) and virtual stack (VSTACK) structure using a field programmable gate array can include a look-up table (LUT) random access memory (RAM) circuit forming a first portion of the HSTACK, circuitry within the LUT RAM circuit for propagating data upwards and downwards forming at least a second portion of the HSTACK, and a direct memory access and cache memory mechanism appended to the HSTACK. In some embodiments the structure may further include a bus peripheral having a control interface, a datapath interface, and a bus interface. The control interface can include signaling for pop/push, stack enable, stack ready, or over/under. The hardware stack structure may further include an auxiliary reset circuit. The hardware stack structure may further include an HSTACK broadside READ function or a HSTACK broadside READ/WRITE function. The hardware stack structure may further include an HSTACK state management circuit.

DETAILED DESCRIPTION OF THE DRAWINGS

The indicated FPGA Hardware STACK (HSTACK) structure can be based upon a standard LUT RAM circuit which can optionally be based on SRL circuitry. In one particular embodiment, however, circuitry has been configured to allow propagation of data both upward, (i.e., POP), or downward, (i.e., PUSH). The HSTACK is intended to support hardware level processing in a multitude of contexts. However, the structure is likely to prove especially useful for construction of high-performance stack processor elements. This motivates certain features including (1) HSTACK composition itself, (e.g., the ability to assemble HSTACK components in to an arbitrarily large structure and providing a synthesizable representation), (2) Virtual STACK structure, (e.g., the ability to append peripheral memory and cache interface/control for virtual extension to an HSTACK address space), (3) auxiliary RESET, (i.e., for HSTACK initialization), (4) HSTACK broadside READ, (i.e., for stack pattern matching), (5) HSTACK READ/WRITE, (e.g., for use in connection with state management functions, [STATE LOAD/STORE]) and (6) a 'domino-style' precharge circuit as basis for HSTACK implementation.

Figure 1:
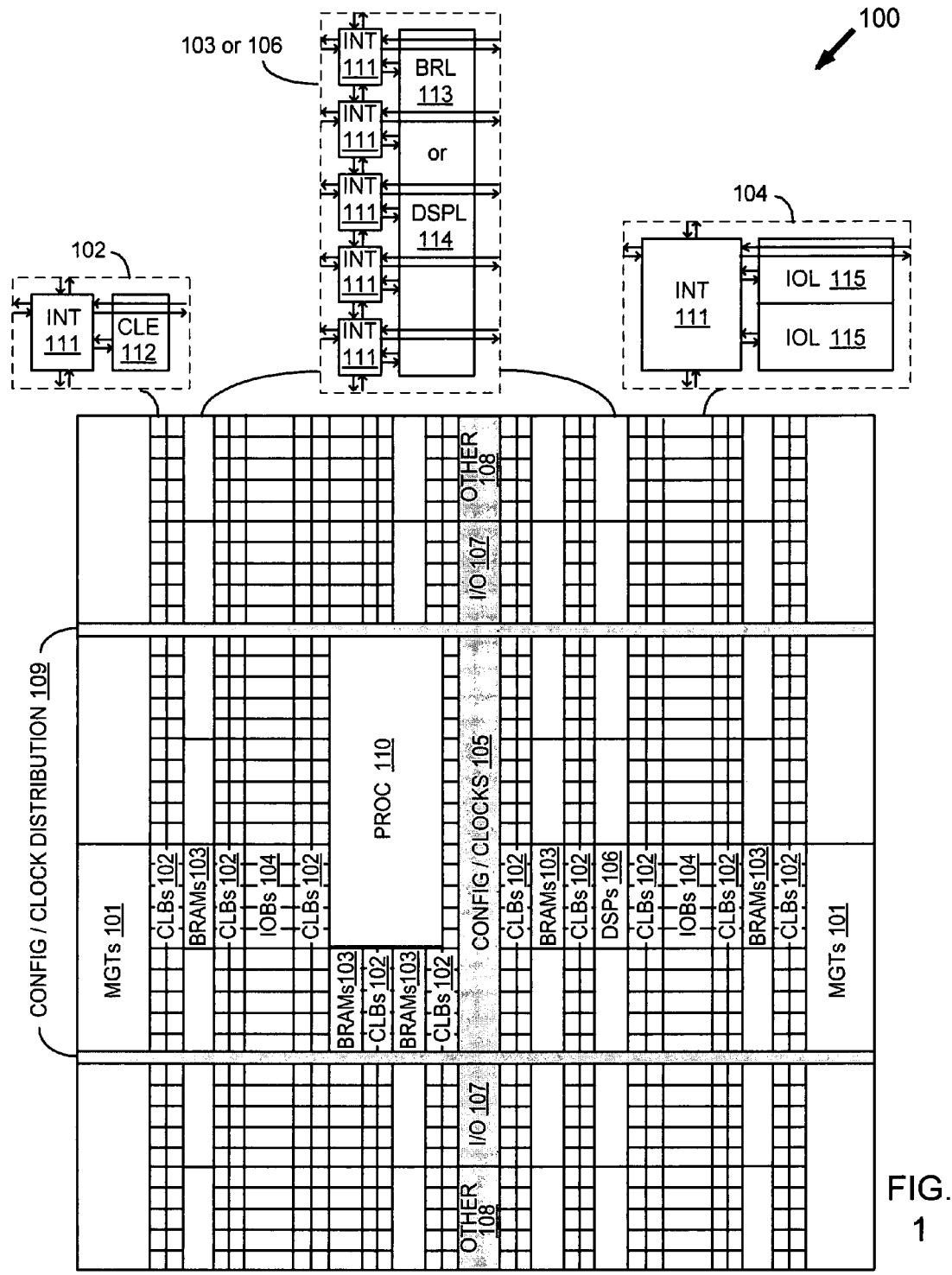
FIG. 1 illustrates a field programmable gate array (FPGA) architecture that includes several different types of programmable logic blocks.

As noted above, advanced FPGAs can include several different types of programmable logic blocks in the array. For example, FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2:
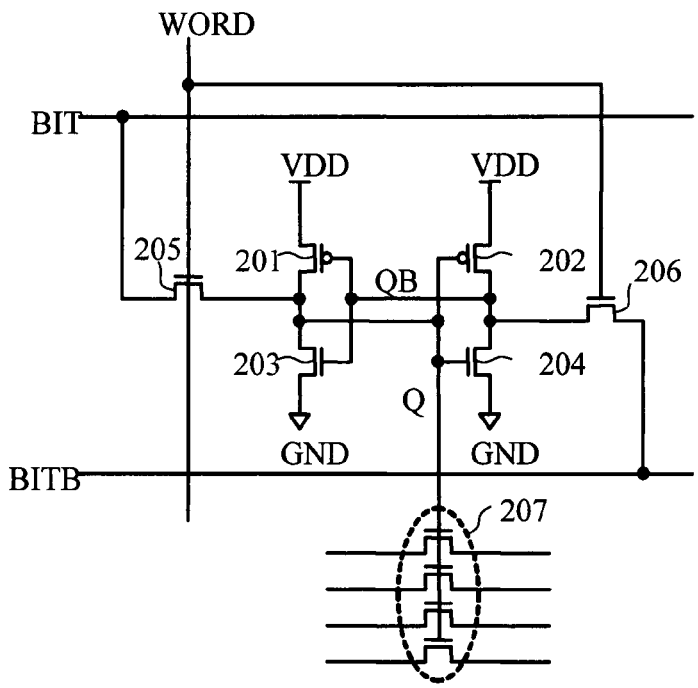
FIG. 2 illustrates a known configuration memory cell and pass gates controlled by the configuration memory cell.

FIG. 2 illustrates a known configuration memory cell 200 and pass gates controlled by the configuration memory cell that can be used in an FPGA, and the use thereof to control transistors within the FPGA. A configuration memory cell typically includes two cross-coupled logic gates, such as the two inverters formed by P-channel transistor 201 and N-channel transistor 203, and by P-channel transistor 202 and N-channel transistor 204. The output nodes of the two cross-coupled logic gates are referred to herein as "storage nodes". The storage node of the first inverter is node Q. In FIG. 2, node Q drives pass gates 207. Pass gates 207 can be, for example, part of a routing multiplexer, lookup table, user storage element (e.g., block RAM or any other type of memory available for the storage of user data), or other configurable element. In some configuration memory cells, node QB, the storage node of the second inverter, drives the pass gates. In some configuration memory cells, both storage nodes Q and QB are used to drive logic external to the cell.

Figure 3:
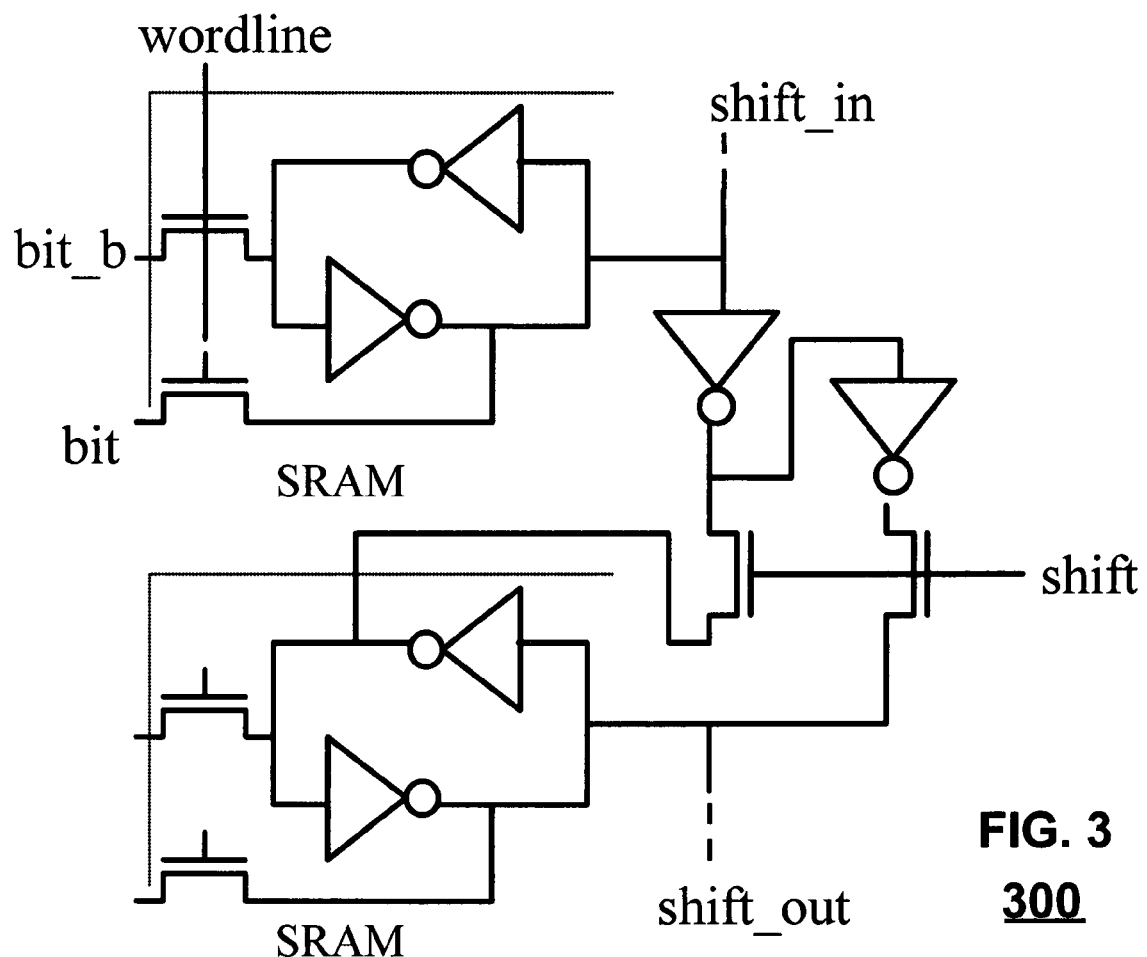
FIG. 3 illustrates an SRAM based shift register.

An N-channel transistor 205 is coupled between node Q and a first bit line BIT, and gated by a word line WORD. Another N-channel transistor 206 is coupled between node QB and a second bit line BITB, which carries an inverse value from the first bit line. Transistor 206 is also gated by word line WORD. Bit lines BIT and BITB are used to carry values written to the configuration memory cell, and also to read values from the configuration memory cell, e.g., during a configuration readback procedure. Variations on the circuit of FIG. 2 are also well known, e.g., two word lines can be provided, or only one bit line can be included. The circuit of FIG. 2 is a representative example of the various well-known memory cell configurations. FIG. 3 illustrates a similar configuration memory cell as illustrated in FIG. 2, but with a slightly different representation.

In FIG. 3, Look-Up-Table (LUT) based static random access memory (SRAM)-based FPGA shift register logic (SRL) 300 is displayed. SRL propagates data in one direction, only (PUSH). Note the absence of any means to apply a RESET, except via application of configuration bits. Further note that there exists no READ/WRITE access to an internal state or save via configuration-plane READ/WRITE.

Figure 4:
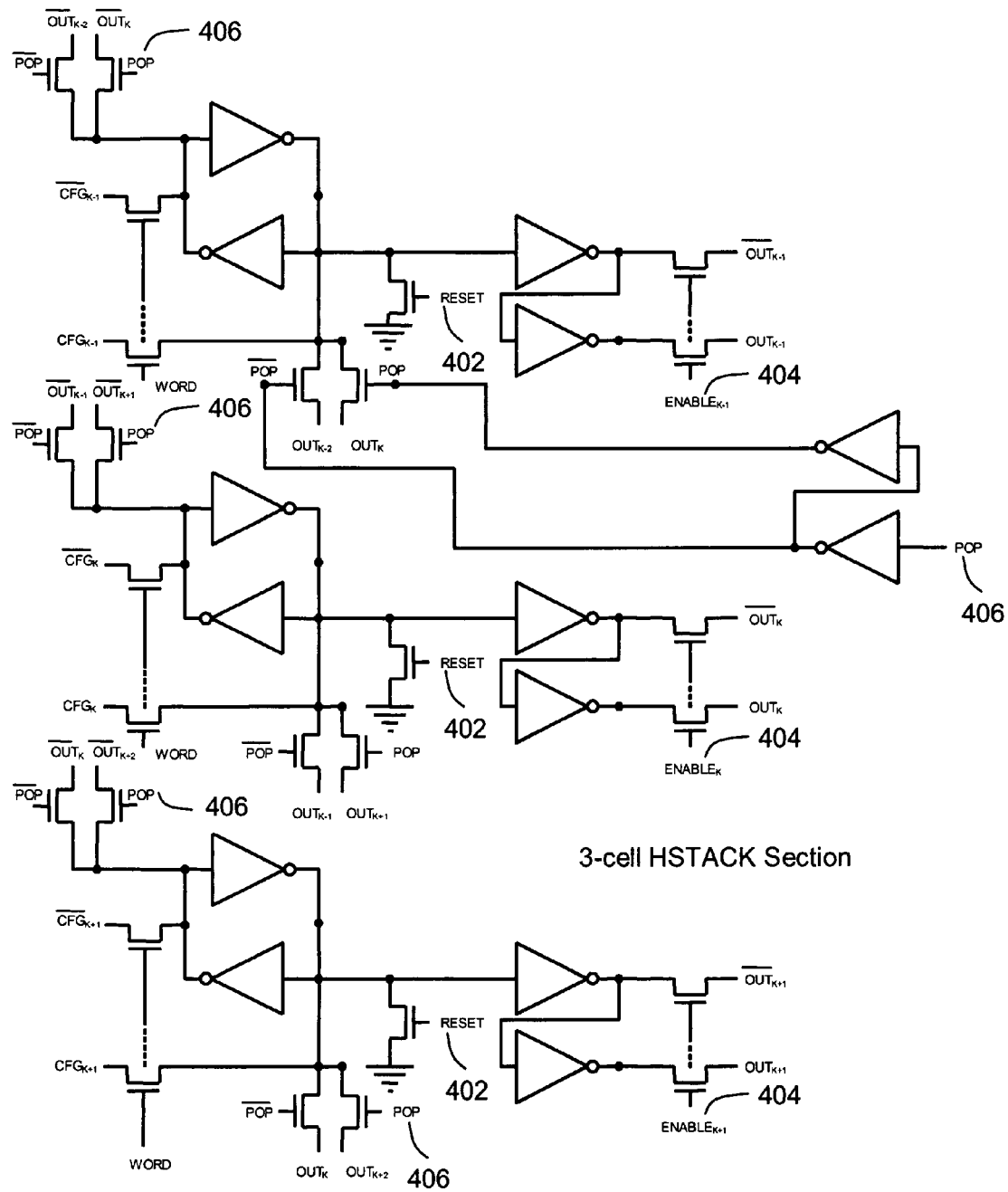
FIG. 4 illustrates a 3-cell hardware stack section in accordance with an embodiment of the present invention.

In FIG. 4, a conceptual realization of a basic HSTACK structure 400 is displayed in the form of a 3-slice section where each 'slice' refers to an HSTACK unit cell, equivalent to repeated SRAM-cell and associated circuitry as shown in FIG. 2. Each HSTACK-cell output is simultaneously fed forward to the next cell and backward to a previous cell (i.e., the input to the Zero$^{th}$ cell forms an HSTACK input, and an output from the last cell is (optionally) appended to a VSTACK cache interface). Data movement direction is controlled by POP 406 and enabled by an ENABLE signal 404, (note cell-to-cell, bidirectional 'ripple' on an ENABLE signal). HSTACK broadside READ accrues at an OUT signal. An auxiliary RESET 402 is provided for HSTACK initialization.

Figure 5:
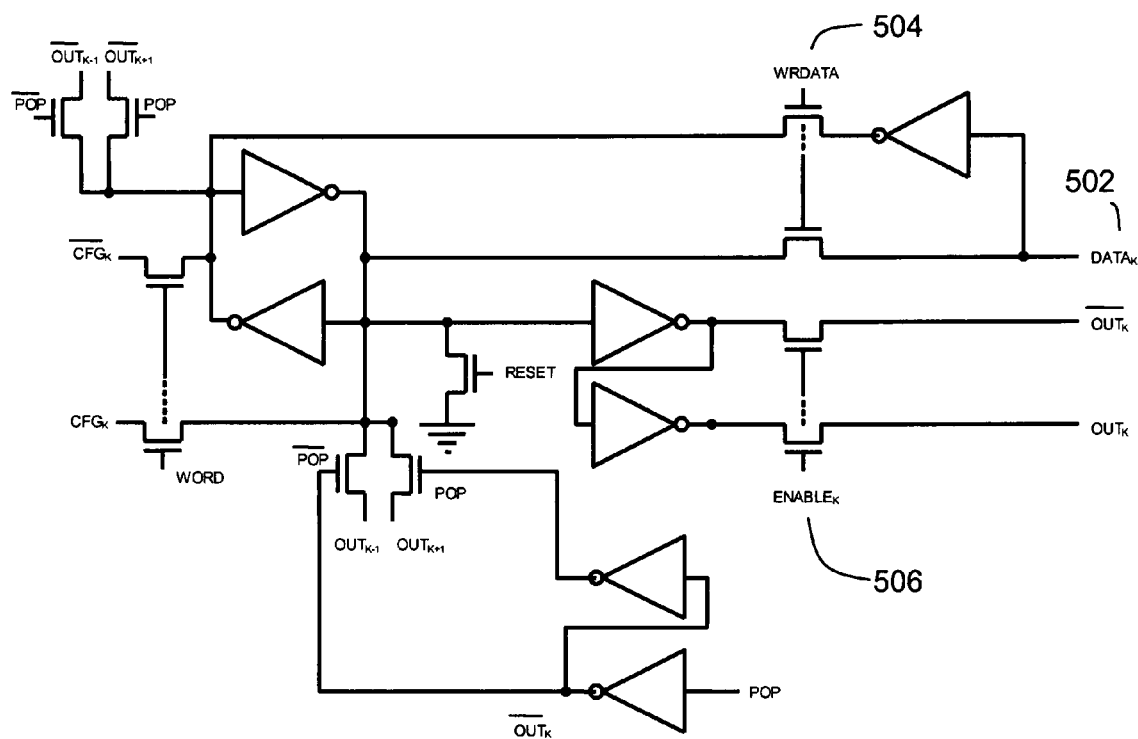
FIG. 5 is a hardware stack cell and a STATE WRITE port in accordance with an embodiment of the present invention.

In FIG. 5, a memory cell 500 comprises a basic HSTACK-cell augmented with an additional WRITE port. Data is applied at 'DATA' 502 and enabled by 'WRDATA' 504. In general, POP/PUSH is not allowed when HSTACK READ/WRITE is active. The resulting HSTACK STATE READ control sequence is then: (1) logic '0' is applied to ENABLEk 506, (2) data is read/latched, and (3) a logic '1' is applied to ENABLEk for resumption of normal HSTACK operation. Similarly, for HSTACK STATE WRITE the control sequence is then: (1) logic '0' is applied to ENABLEk, (2) logic '1' is applied to WRDATA 504, (3) written data is latched, (4) logic '0' is applied to WRDATA, and (5) logic '1' is applied to ENABLEk for resumption of normal HSTACK operation.

Figure 6:
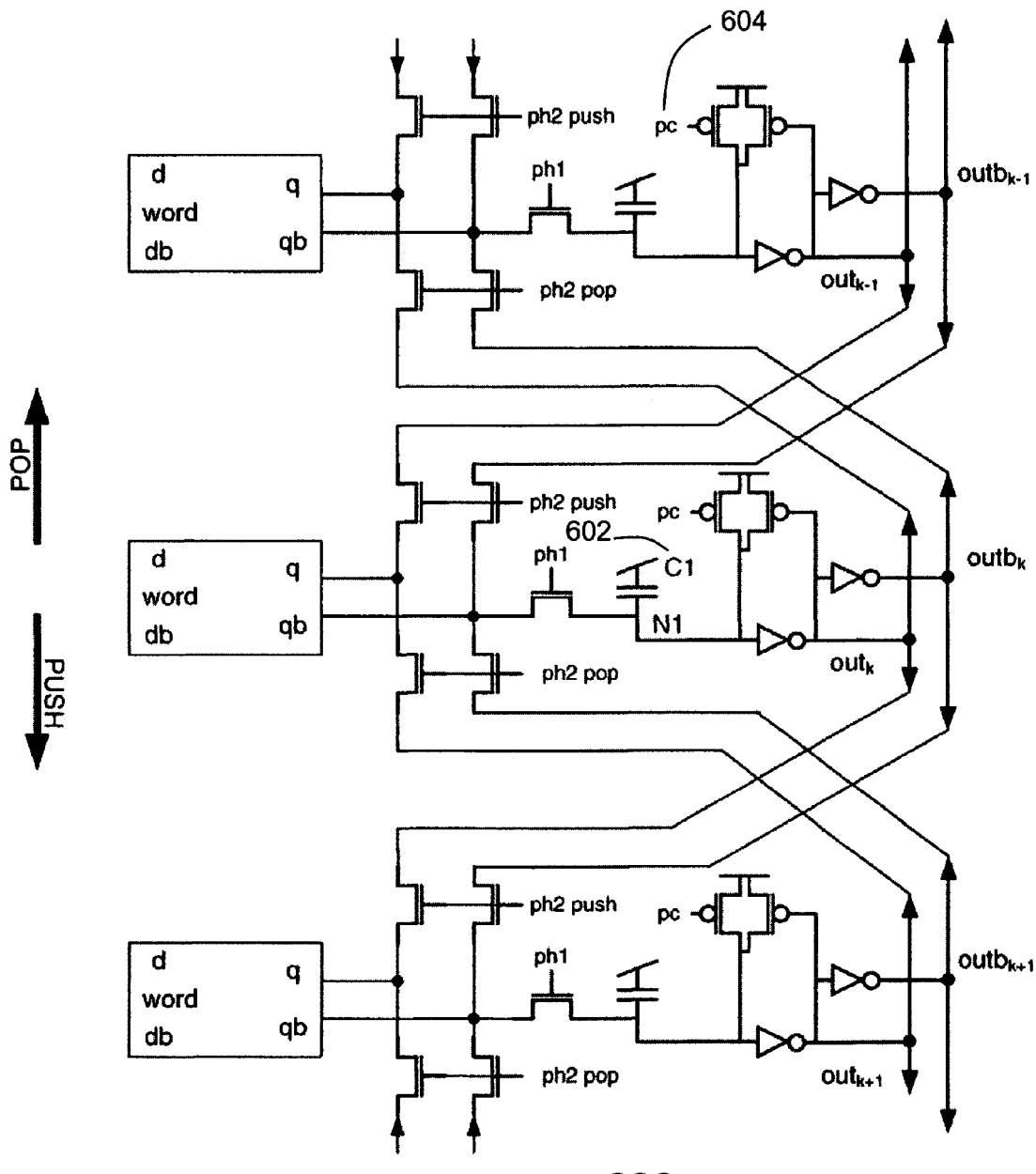
FIG. 6 illustrates another 3-cell hardware stack section using a pre-charge clock or circuit in accordance with an embodiment of the present invention.

In FIG. 6, a 'domino-style' precharge circuit 600 is presented as a basis for HSTACK implementation. This circuit does not rely on ratio logic for a slave latch and therefore should ease sizing constraints. The circuit 600 is similar to the embodiment of FIG. 4, but this does not completely rely on C1 (602) for storing the value in the slave latch. This uses a semi-dynamic scheme and requires a precharge clock 604, denoted as "pc". The precharge clock 604 can be related to a slave clock (ph1_b) or some combination of slave clock (ph2) signals.

During the precharge cycle, a dynamic node N1 is precharged to HIGH. When ph1 goes HIGH (during this time "pc" must be LOW), the master latch (the SRAM cell) will either discharge the node if it is LOW or let N1 remain HIGH. If it stays high, a small keeper (C1) is used to maintain the charge. Then if N1 is HIGH, it is weakly driven helping avoid coupling problems with a fully dynamic implementation. If N1 has been discharged, it still exhibits problems with noise coupling and leakage charging the value to an artificial HIGH value.

Stack structures are already implementable on FPGA fabric. However, they likely exist as relatively inefficient composite structures. Hardware STACK (HSTACK) engenders transistor-level modification to LUT RAM/SRL, motivated by a goal of minimum area and highest possible clock speed. Thus, HSTACK can greatly out-perform any logically equivalent composed structure. One particularly significant use-model or HSTACK is in construction of stack processor elements where stack operations typically dominate the performance envelope. HSTACK is then expected to afford near optimal performance in this context. HSTACK can also prove useful for support of recursive programming models.

For the particular case of a stack processor, two issues can accrue, namely (1) available stack depth, and (2) power consumption associated with stack POP/PUSH. The problem of stack depth is addressed via exposed datapath ports at HSTACK 'bottom', whereby a BRAM or cache interface may be attached. In this manner, HSTACK may be extended as Virtual STACK (VSTACK) to more or less arbitrary depth. The power consumption issue is also addressed by virtue of a VSTACK. HSTACK control is generally expected to maintain a watermark with pointer and increment into VSTACK. Thus, movement of data into and out of an HSTACK does not occur until resident data moves out of context, as indicated by an HSTACK pointer position relative to the watermark. At such a point, a VSTACK block First-In-Last-Out (FILO) READ/WRITE occurs and the VSTACK pointer increment updated, (i.e., the original VSTACK data does not move for VSTACK WRITE, and only the most recent block moves for VSTACK READ). All other HSTACK POP or PUSH operations do not engender movement of data between HSTACK and VSTACK. In this manner, actual data movement and resulting power consumption is minimized.

HSTACK can be by nature considered a stateful entity. For example, in the stack processor example cited above, HSTACK can contain all or a significant portion of processing context. Thus, under a multi-process 'fork', or partial reconfiguration, context must be archived. This implies HSTACK READ/WRITE operations, (i.e., HSTACK 'READ' for STATE STORE, HSTACK 'WRITE' for STATE LOAD). These operations may be subsumed under the aegis of a Real Time Operating System/Finite State Machine (RTOS/FSM)-level processing management control function, and is nominally expected to involve READ/WRITE of context from/to VSTACK.

Within context of the cited stack processor application HSTACK broadside READ, (i.e., parallel READ from all HSTACK positions, as distinct from POP/PUSH), is useful for opcode pattern matching. Among other possible uses, this feature can be used to provide a fundamental hardware resource for reorder buffering in connection with dynamic branch prediction and instruction processing management on a new class of stack oriented superscalar/VLIW processor architectures. At the level of multi-threaded OS/RTOS system management, this feature can also find use in connection with implementation of functional and dataflow programming models.

Figure 7:
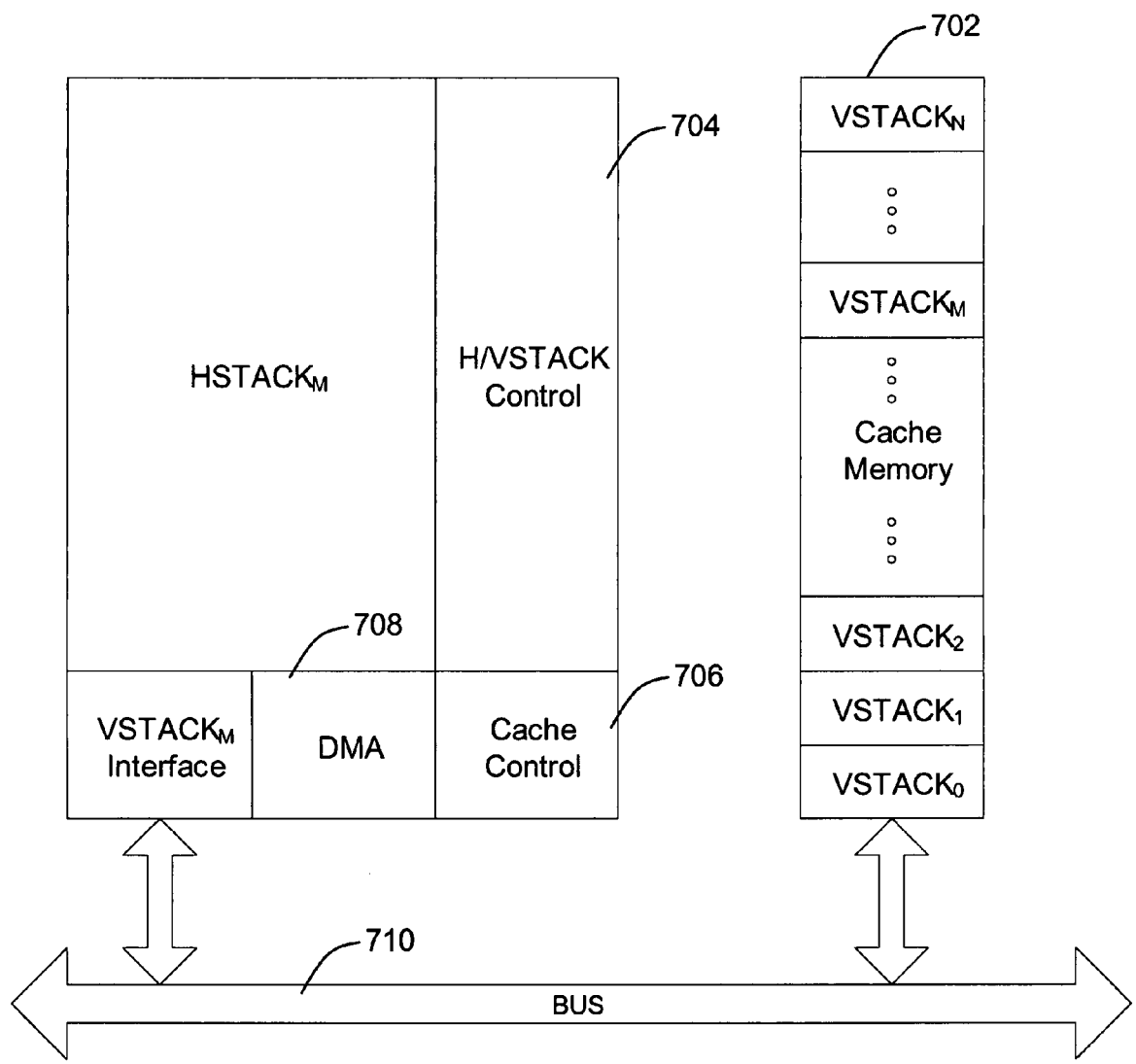
FIG. 7 is block diagram of a multi-hardware stack and virtual stack platform in accordance with an embodiment of the present invention.

In FIG. 7, one possible form of a conceptual embedded system-style VSTACK implementation 700 is displayed in form of multiple VSTACKs 702 supported from a single peripheral memory. The VSTACK mechanism is supported by associated H/VSTACK control 704, cache control 706, DMA 708 and BUS interconnect 710 to reserved peripheral memory (not shown).

Figure 8:
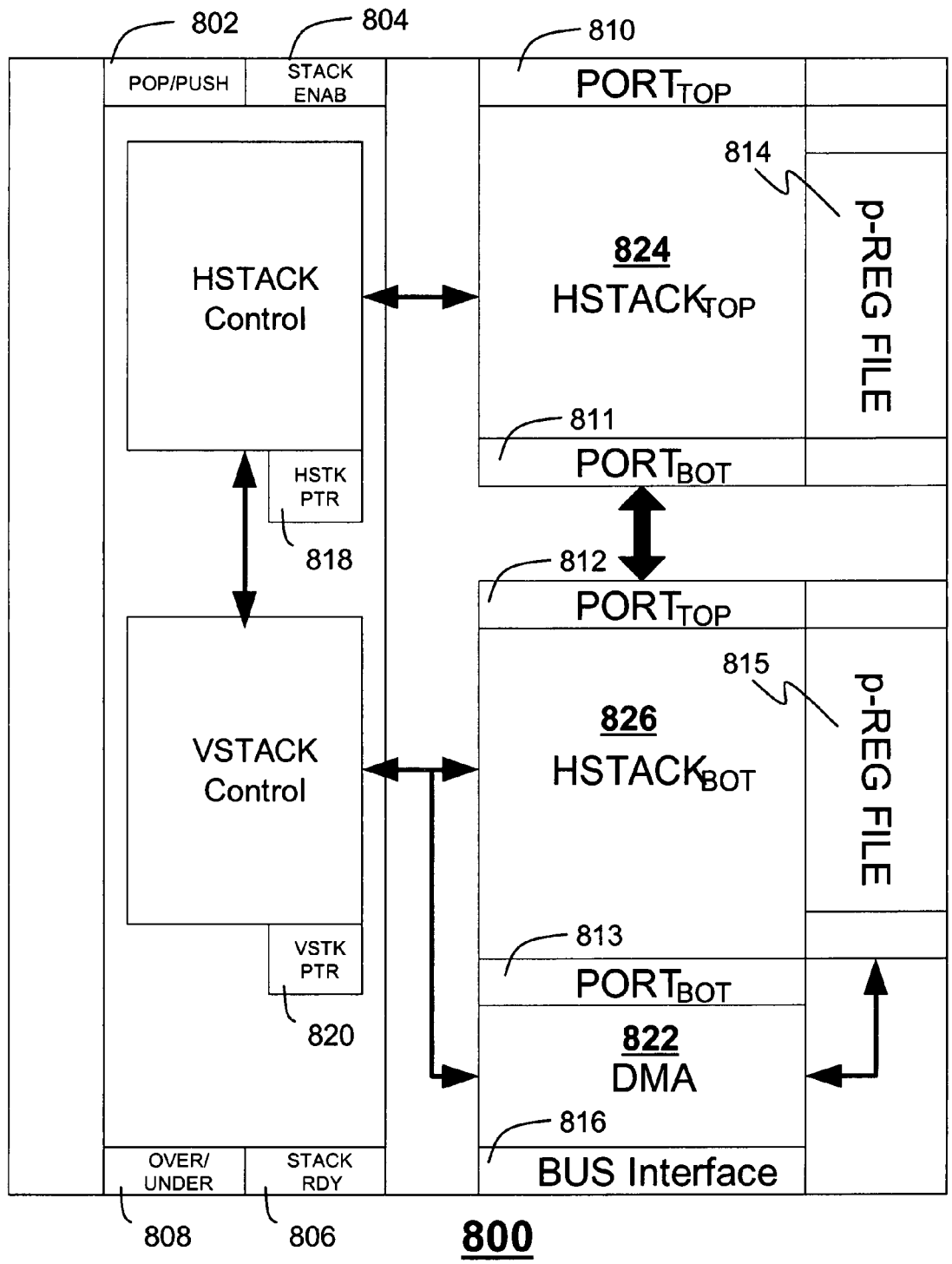
FIG. 8 is a block diagram of a virtual stack (VSTACK) in accordance with an embodiment of the present invention.

Another possible realization of the VSTACK structure is illustrated by the VSTACK block diagram 800 of FIG. 8. Generally speaking, a VSTACK or Virtual STACK, is intended as a extension to the HSTACK structure in much the same manner as virtual memory is intended as an extension to physical memory. In one possible implementation, VSTACK accomplishes this by virtue of direct memory access (DMA) and cache mechanisms appended to the basic HSTACK structure, in conjunction with use of an external dedicated RAM resource (not shown since external RAM is implied by the DMA interface). This RAM resource is capable of essentially arbitrary scaling in size, independent of the actual HSTACK resource employed. In a typical embedded system design, VSTACK communicates with RAM via a bus structure plus a peripheral interface. STACK virtualization logically results from DMA and cache control operations operationally contained below the STACK interface, and from STACK depth being rendered arbitrarily large.

In FIG. 8, the VSTACK 800 can be configured as a bus peripheral exhibiting some or all of the following characteristics: (1) control interface, (e.g. 'POP/PUSH' 802, 'STACK_ENABLE' 804, 'STACK_RDY' 806, 'OVER_UNDER' 808 signals), (2) datapath interface, (e.g., HSTACK 'PORT$_{TOP}$' 810), pattern/DMA interface, (e.g., 'p-REG_FILE' 814 and 815), and BUS interface 816. The 'POP/PUSH', 'STACK_ENABLE' signals 802 and 804 can be employed in more or less standard fashion for either placing data onto the STACK 800, (i.e., 'PUSH'), or removing data, (i.e., 'POP'). The stack interface can be accessed as a standard datapath resource, or alternatively within context of processor stack manipulation, (e.g., using recursion, interrupt service routines, process forking, multi-threading context management, among others). The pattern/DMA interface (814 and 815) can be arranged in the form of a register file attached to STACK 'READ/WRITE' ports described as part of the HSTACK structure described previously above with respect to FIG. 7. Where VSTACK is utilized as a processor architectural component, pattern analysis may be performed on register file contents for stack processor variants on VLIW/SuperScalar multi-ALU fabric control generation. External RAM READ/WRITE operations are implemented over the BUS interface 816, under control of VSTACK Cache/DMA mechanisms (818, 820 and 822).

Note in FIG. 8, VSTACK employs two appended HSTACK structures, (i.e., the top HSTACK 'PORT$_{BOT}$' 811 of HSTACK$_{TOP}$ 824 connected to the bottom HSTACK 'PORT-$_{TOP}$' 812 of HSTACK$_{BOT}$ 826. Basically, VSTACK cache operations are staged in the bottom HSTACK 826. More specifically, VSTACK cache as contemplated can initiate block DMA transfer to/from RAM when (bottom) HSTACK 826 reaches a predefined watermark, (possibly distinct for 'POP' and 'PUSH'), with associated update of HSTACK and VSTACK pointers 818 and 820. Note, the 'OVER_UNDER' flag 808 defined on the VSTACK boundary indicates STACK underrun/overrun conditions. Use of two HSTACK components in this fashion is not a requirement, as long as appropriate synchronization is maintained and cache coherency is guaranteed. As a simple example, STACK POP/PUSH operations may be restricted to intervals where VSTACK DMA transactions are not in progress. A more complex approach, (with likely higher performance), is to allow pipelining of HSTACK and VSTACK operations, with guaranteed state resolution prior to loss of cache coherency. There are many possibilities available in this regard.

HSTACK may consist of an arbitrary number of constituent sections, (i.e., up to some resource limit). For some applications, 'deep' HSTACK may be in order. In such cases, movement of large amounts of data during (HSTACK) POP/PUSH may result in unacceptable performance degradation. In such cases, linked-list 'rubber-banding' schemes may be employed for preferential movement of data near HSTACK top 824. This technique is applicable whether BRAM or external RAM is employed as a basis for VSTACK extension. In this manner, performance loss may be mitigated at expense of greater HSTACK control complexity. 'Shallow' HSTACK eliminates this problem to a great extent via a proportionally increased use of Block/external RAM. The HSTACK/VSTACK boundary can be dynamically maintained by virtue of a VSTACK pointer 820. RAM data movement can be constrained modulo a single block size with associated pointer(s) updated, extending or contracting VSTACK depth with no accompanying 'ripple' shifts. However, depending upon use statistics and actual STACK depth, this avoidance of 'ripple' shifts may accrue with unacceptable cost in terms of speed and power. In other words, VSTACK operations remain fundamentally higher in latency and of substantially higher complexity. Thus, for any given application, an essential system performance trade-off is revealed with respect to HSTACK vs. VSTACK depth.

As described above, DMA (822) is performed under the aegis of cache control. Once an HSTACK block transfer is scheduled, the DMA state machine 822 moves data to/from external RAM via a sequence of memory transfer requests. During VSTACK 'PUSH', DMA 822 copies data from HSTACK bottom 826, (i.e., via HSTACK broadside 'READ' ports expressed in the associated p-REG file 815), and moves data to external RAM as indicated. The operation is reversed during VSTACK 'POP', (i.e., via HSTACK broadside 'WRITE' ports). VSTACK PUSH/POP operations are accompanied by any required STACK access control, (e.g., 'STACK_RDY' 806), and associated HSTACK pointer updates. Note, this latter pointer update constitutes a STACK 'garbage collection' operation during VSTACK 'PUSH', and HSTACK expansion, (i.e., from the bottom), during VSTACK 'POP'. Also note the distinction between VSTACK PUSH/POP and HSTACK PUSH/POP. In the former, a DMA transfer is always performed. In particular, no 'ripple' shifts of STACK contents are performed during VSTACK PUSH/POP.

As contemplated in one embodiment, VSTACK can exist as an Intellectual Property (IP) Core. For example, within the Xilinx EDK/XPS embedded system/platform design environment, VSTACK can be instanced in the form of an HDL 'wrapper', within which instances of HSTACK, DMA, and all associated control mechanisms are contained. Note HSTACK may still be instanced as a stand-alone hardware component. In such case, HSTACK is analogous to the SRL16 construct described above.

In light of the foregoing description of the invention, it should be recognized that the present invention can be realized in hardware, software, or a combination of hardware and software. A method and system configuring a partially reconfigurable switch according to the present invention can be realized in a centralized fashion in one computer system, or in a distributed fashion where different elements are spread across several interconnected processing modules. A typical combination of hardware and software could be a general purpose computer system with a computer program that, when being loaded and executed, controls the computer system such that it carries out the invention described herein.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

What is claimed is:

1. A hardware stack (HSTACK) structure using programmable logic, comprising:
   a look-up table (LUT) random access memory (RAM) circuit; and
   circuitry within the LUT RAM circuit for propagating data upwards and downwards;
   wherein the hardware stack structure further comprises an HSTACK state management circuit.

2. The hardware stack structure of claim 1, wherein the hardware structure is arbitrarily assembled into a larger structure by adding stacks to a top portion, a bottom portion, or a portion between the top portion and the bottom portion.

3. The hardware stack structure of claim 1, wherein the hardware stack structure further comprises a virtual stack (VSTACK) structure coupled to the HSTACK structure within a field programmable gate array (FPGA) fabric.

4. The hardware stack structure of claim 3, wherein the VSTACK is arranged in the form of an appended peripheral memory and cache control for virtual extension to an HSTACK address space.

5. The hardware stack structure of claim 1, wherein the hardware stack structure further comprises an auxiliary reset circuit.

6. The hardware stack structure of claim 1, wherein the hardware stack structure further comprises an HSTACK broadside read function.

7. The hardware stack structure of claim 1, wherein the hardware stack structure further comprises a HSTACK broadside read and write function.

8. The hardware stack structure of claim 1, wherein the hardware stack structure further comprises a domino style pre-charge circuit.

9. The hardware stack structure of claim 1, wherein the hardware stack structure is synthesizable.

10. A hardware stack (HSTACK) and virtual stack (VSTACK) structure using a programmable device, comprising:
    a look-up table (LUT) random access memory (RAM) circuit forming a first portion of the HSTACK;
    circuitry within the LUT RAM circuit for propagating data upwards and downwards forming at least a second portion of the HSTACK; and
    a direct memory access and cache memory mechanism appended to the HSTACK.

11. The HSTACK and VSTACK structure of claim 10, wherein the structure further comprises a bus peripheral having a control interface, a datapath interface, and a bus interface.

12. The HSTACK and VSTACK structure of claim 11, wherein the control interface comprises signaling for pop/push, stack enable, stack ready, or over/under.

13. The HSTACK and VSTACK structure of claim 10, wherein the HSTACK and VSTACK structure further comprises an internal Block RAM (BRAM) or external random access memory (RAM) with read and write functions implemented over a hardware communications interface, under control of the direct memory access and the cache memory mechanism.

14. The HSTACK and VSTACK structure of claim 10, wherein the hardware structure is arbitrarily assembled into a larger structure by adding stacks to a top portion, a bottom portion, or a portion between the top portion and the bottom portion.

15. The HSTACK and VSTACK structure of claim 10, wherein the VSTACK is arranged in the form of an appended BLOCK RAM or peripheral memory and cache control for virtual extension to an HSTACK address space.

16. The HSTACK and VSTACK structure of claim 10, wherein the hardware stack structure further comprises an auxiliary reset circuit.

17. The HSTACK and VSTACK structure of claim 10, wherein the hardware stack structure further comprises an HSTACK broadside read function.

18. The HSTACK and VSTACK structure of claim 10, wherein the hardware stack structure further comprises a HSTACK broadside read and write function.

19. The HSTACK and VSTACK structure of claim 10, wherein the hardware stack structure further comprises an HSTACK state management circuit.

* * * * *